US008219980B2

(12) United States Patent
Bates et al.

(10) Patent No.: US 8,219,980 B2
(45) Date of Patent: Jul. 10, 2012

(54) IDENTIFYING A POTENTIAL BREAKPOINT LOCATION IN A CODE PATH IN A COMPUTER PROGRAM BASED UPON THE FREQUENCY OF EXECUTION OF THE CODE PATH AS IDENTIFIED IN COLLECTED PROFILE DATA

(75) Inventors: Cary Lee Bates, Rochester, MN (US); Mark Douglas Schroeder, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1583 days.

(21) Appl. No.: 11/621,777

(22) Filed: Jan. 10, 2007

(65) Prior Publication Data

US 2008/0168428 A1 Jul. 10, 2008

(51) Int. Cl.
*G06F 9/44* (2006.01)
(52) U.S. Cl. ........ 717/129; 717/124; 717/125; 717/126; 717/127; 717/130
(58) Field of Classification Search ........................ None
See application file for complete search history.

(56) References Cited

U.S. PATENT DOCUMENTS

| | | | |
|---|---|---|---|
| 6,077,312 A | 6/2000 | Bates et al. | |
| 6,378,124 B1 | 4/2002 | Bates et al. | |
| 6,412,106 B1 * | 6/2002 | Leask et al. | 717/124 |
| 6,587,967 B1 | 7/2003 | Bates et al. | |
| 6,658,650 B1 | 12/2003 | Bates | |
| 6,961,924 B2 | 11/2005 | Bates et al. | |
| 6,966,051 B2 * | 11/2005 | McBrearty et al. | 717/124 |
| 6,981,248 B2 | 12/2005 | Bates et al. | |
| 6,996,806 B2 | 2/2006 | Bates et al. | |
| 7,689,558 B2 * | 3/2010 | Rossmann | 717/127 |
| 2005/0273765 A1 * | 12/2005 | Arnold et al. | 717/129 |
| 2006/0020921 A1 * | 1/2006 | Pasumansky et al. | 717/124 |
| 2006/0041867 A1 * | 2/2006 | Bates et al. | 717/129 |
| 2007/0300213 A1 * | 12/2007 | Adolphson et al. | 717/151 |
| 2008/0092128 A1 * | 4/2008 | Corry et al. | 717/158 |

OTHER PUBLICATIONS

Duesterwald et al., "Software profiling for hot path prediction: less is more," A.C.M., 2000.*
"control flow graph", 2006 Answers Corporation (1996) web pages downloaded on Jul. 24, 2006 from www.answers.com/topic/control-flow-graph, 4 pages.

* cited by examiner

*Primary Examiner* — Insun Kang
(74) *Attorney, Agent, or Firm* — Wood, Herron & Evans LLP

(57) ABSTRACT

An apparatus, program product and method identify a potential breakpoint location in a code path in a computer program based upon the frequency of execution of the code path as identified in collected profile data. By doing so, a potential breakpoint location may be identified for an infrequently executed code path and/or a frequently executed code path, and a breakpoint may be set at the identified breakpoint location. As such, breakpoints may be set in locations that may be more likely to assist a user in debugging the computer program and may result in more efficient debugging.

25 Claims, 4 Drawing Sheets

IDENTIFYING A POTENTIAL BREAKPOINT LOCATION IN A CODE PATH IN A COMPUTER PROGRAM BASED UPON THE FREQUENCY OF EXECUTION OF THE CODE PATH AS IDENTIFIED IN COLLECTED PROFILE DATA

FIELD OF INVENTION

The invention is directed to debuggers and debugging of computer programs. In particular, the invention is generally related to breakpoints for debugging computer programs and the like.

BACKGROUND OF THE INVENTION

Locating, analyzing and correcting suspected faults or bugs in a computer program is a process known as "debugging." Typically, a programmer uses another computer program commonly known as a "debugger" to debug a program under development.

Conventional debuggers typically support two primary operations to assist a computer programmer. A first operation supported by conventional debuggers is a "step" function, which permits a computer programmer to process instructions (also known as "statements") in a computer program one-by-one, and see the results upon completion of each instruction. While the step operation provides a programmer with a large amount of information about a program during its execution, stepping through hundreds or thousands of program instructions can be extremely tedious and time consuming, and may require a programmer to step through many program instructions that are known to be error-free before a set of instructions to be analyzed are executed.

To address this difficulty, a second operation supported by conventional debuggers is a breakpoint operation, which permits a computer programmer to identify with a "breakpoint" a precise instruction for which it is desired to halt execution of a computer program during execution. As a result, when a computer program is executed by a debugger, the program executes in a normal fashion until a breakpoint is reached, and then stops execution and displays the results of the computer program to the programmer for analysis. Most breakpoints supported by conventional debuggers are unconditional, meaning that once such a breakpoint is reached, execution of the program is always halted.

Typically, step operations and breakpoints are used together to simplify the debugging process. Specifically, a common debugging operation is to set a breakpoint at the beginning of a desired set of instructions to be analyzed, and then begin executing the program. Once the breakpoint is reached, the program is halted, and the programmer then steps through the desired set of instructions line by line using the step operation. Consequently, a programmer is able to quickly isolate and analyze a particular set of instructions without having to step through irrelevant portions of a computer program.

However, one significant drawback of utilizing breakpoints is the identification of locations to set the breakpoints. A "good" breakpoint location may be a location in the code just before the bug is encountered. Although a programmer can sometimes identify a "good" breakpoint location based upon his or her familiarity with the computer program's code and/or error conditions, oftentimes a programmer is not familiar with the computer program that he or she is trying to debug. For instance, the code of the program may have been written by a colleague, and as such, it may be difficult to identify a good location for a breakpoint other than by chance.

This is problematic because some instructions in a computer program are executed fairly often for different purposes, and incorrect placement of breakpoints may result in many needless stoppages before a desired stoppage is encountered. This problem is especially pronounced in object-oriented programming (OOP) and other highly modular languages, where a single general purpose portion of a computer program may be executed in a number of different situations for different purposes.

With an object-oriented programming language, for example, a program is constructed from a number of "objects", each of which including data and/or one or more sets of instructions (often referred to as "routines" or "methods") that define specific operations that can be performed on the data. A large number of objects may be used to build a computer program, with each object interacting with other objects in the computer program to perform desired operations. Some general purpose objects in a computer program, in particular, may have routines that are called by many different objects, and thus placing a breakpoint in a routine of such an object may result in hundreds of unwanted stoppages prior to occurrence of a desired stoppage. A computer programmer may be able to alleviate this problem to some extent by relocating the breakpoints but this is also typically a tedious and time-consuming process.

In addition to the delay and waste in time and/or resources that may be caused by these unwanted stoppages, a large number of unwanted stoppages are also problematic because it may indicate that this code path (i.e., series of instruction in order of execution) is a frequently executed code path in the computer program, also known as a "hot path". However, the bugs in a computer program are oftentimes associated with a code path that is infrequently executed, also known as a cold path; otherwise, the bug would have already been encountered and resolved much earlier in the development process.

Even the identification of good locations to set conditional breakpoints, as opposed to unconditional breakpoints, is problematic. In particular, some debuggers support the use of conditional breakpoints, which only halt execution of a program when a variable used by the program is set to a predetermined value at the time such a breakpoint is reached. However, once again, unless the programmer knows of a specific condition to utilize, for example, based upon his or her familiarity with the computer program, and the condition is sufficiently unique, the programmer may also be faced with hundreds of unwanted stoppages.

Therefore, a significant need continues to exist for an improved manner of debugging computer programs, specifically in the area of identifying breakpoint locations, that is not primarily dependent on a programmer's familiarity with the program.

SUMMARY OF THE INVENTION

The invention addresses these and other problems associated with the prior art by providing an apparatus, a program product, and a method that identify a potential breakpoint location in a code path in a computer program based upon the frequency of execution of the code path as identified in collected profile data. Consistent with the invention, some embodiments may collect profile data for a computer program to identify frequencies of execution for a plurality of code paths in the computer program and identify at least one potential breakpoint location in a code path in the computer program based upon the frequency of execution of the code path as identified in the profile data. By doing so, a potential breakpoint location may be identified for an infrequently executed code path and/or a frequently executed code path, and a breakpoint may be set at the identified breakpoint location. As such, breakpoints may be set in locations that may be more likely to assist a user in debugging the computer program and may result in more efficient debugging.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there are described exemplary embodiments of the invention.

DETAILED DESCRIPTION OF THE INVENTION

Figure 1:
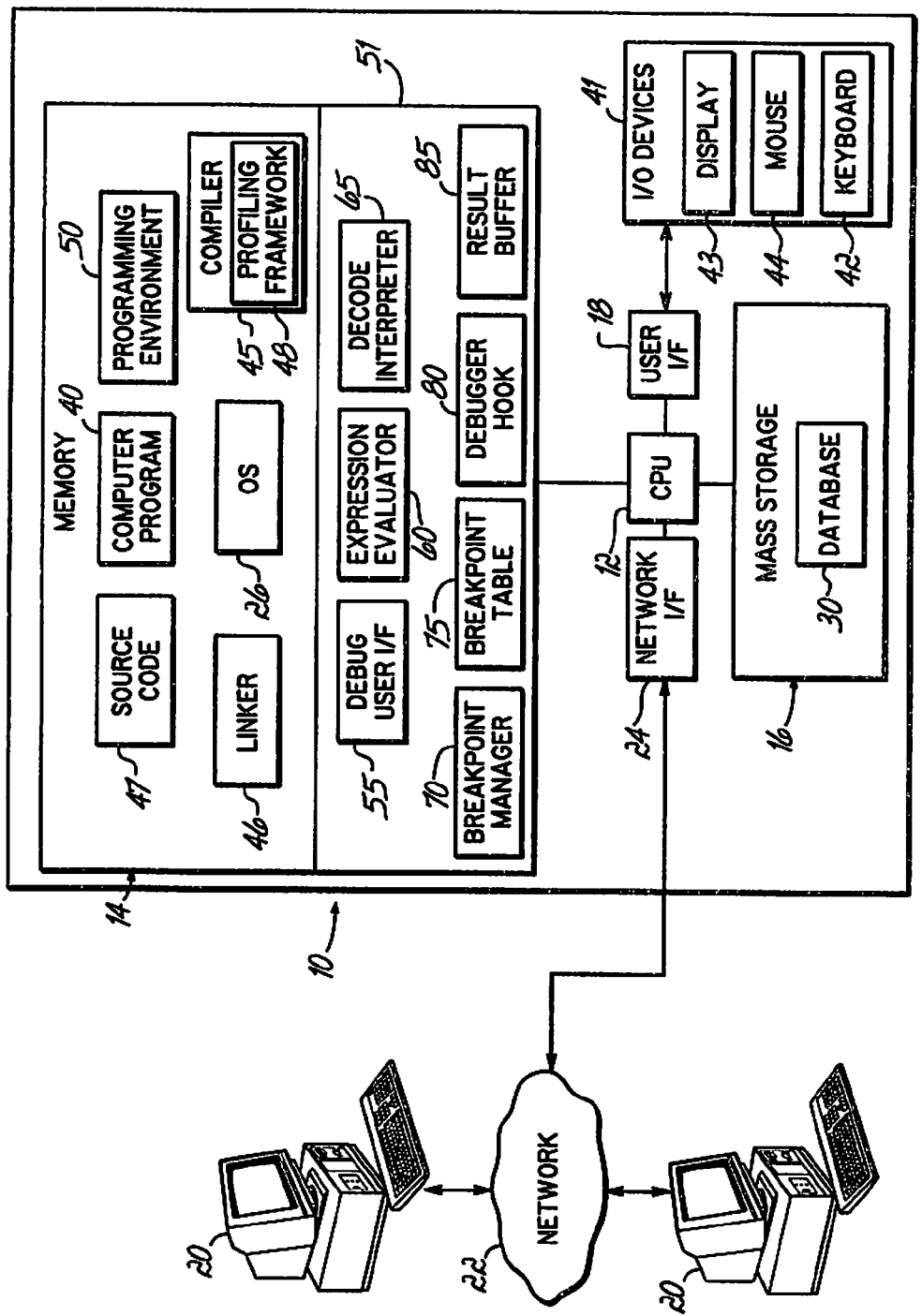
FIG. 1 is a block diagram of a networked computer system, including a debugger, implementing the identification of potential breakpoint locations consistent with the invention.

Turning now to the Drawings, wherein like numbers denote like parts throughout the several views, FIG. 1 illustrates an exemplary hardware environment for an apparatus 10 for implementing the identification of breakpoint locations consistent with the invention. For the purposes of the invention, apparatus 10 may represent practically any type of computer, computer system or other programmable electronic device, including a client computer, a server computer, a portable computer, a handheld computer, an embedded controller, etc. Moreover, apparatus 10 may be implemented using one or more networked computers, e.g., in a cluster or other distributed computing system. Apparatus 10 will hereinafter also be referred to as a "computer," although it should be appreciated that the term "apparatus" may also include other suitable programmable electronic devices consistent with the invention.

Computer 10 typically includes a central processing unit (CPU) 12 including one or more microprocessors coupled to a memory 14, which may represent the random access memory (RAM) devices comprising the main storage of computer 10, as well as any supplemental levels of memory, e.g., cache memories, non-volatile or backup memories (e.g., programmable or flash memories), read-only memories, etc. In addition, memory 14 may be considered to include memory storage physically located elsewhere in computer 10, e.g., any cache memory in a processor in CPU 12, as well as any storage capacity used as a virtual memory, e.g., as stored on a mass storage device 16 or on another computer coupled to computer 10. The memory 14 may include an executable computer program 40, source code 47, a compiler 45, linker 46, and a programming environment 50.

In operation, a developer writes source code 47 in programming environment 50, which may be an integrated development environment (IDE). Once the source code is written, compiler 45 parses the source code 47 to produce object code. The object code can then be linked by the linker 46 to produce program 40. As part of the compilation process, compiler 45 produces a symbol table 120 (FIG. 3), which is a collection of symbols (variables and types along with scoping information) within the program 40. Compiler 45 may also include a profiling framework 48 that collects profile data. Profile data consistent with the invention may be data associated with the computer program. A feature of profiling frameworks is the collection of profile data that allows hot and cold code paths in a method of a program to be determined. Thus, for example, profile data may be hot path information (i.e., frequently executed code path) and/or cold path information (i.e., infrequently executed code path), performance data, data about the execution profile of the source code, data associated with debugging, the number of times that a routine in a computer program is executed, the number of IO's during execution, etc. Profile data consistent with the principles of the present invention may also be a summary of profile data. Although most modern compilers include profiling frameworks, those of ordinary skill in the art will appreciate that other variations are within the scope of the present invention. For instance, some compilers require a separate profiling step, for example, whereby a program is compiled, profiled, and then re-compiled after profiling.

Moreover, some profiling frameworks run on a near continuous basis such as those associated with Java. In particular, Java is oftentimes dependent on the use of JIT compilers, and as such, fresh profile data is generally collected each time that application or computer program 40 is run or continuously collected for at least some set of methods while the application continues to run. On the other hand, some profiling frameworks collect profile data in a static manner. Nonetheless, as long as profile data is being generated and/or updated, either via dynamic or static collection, then this profile data, or a summary of this data, may be made available (e.g., via an API) to the debugger (e.g., from the profiling framework) and utilized consistent with the principles of the present invention. Profiling may also be performed independent of any compiler.

Next, debugger 51 may be utilized to debug computer program 40. In particular, a debug user interface 55, which may be a third-party debugging program, an expression evaluator 60, a decode interpreter 65, a breakpoint manager 70, a breakpoint table 75, a debugger hook 80, and a result buffer 85 may be components of debugger 51. One or more of the debugger components may exist separately in computer 10 or may be part of a larger grouping such as an IDE. Additionally, debugger 51 may include fewer than the components shown or additional components not shown. The relationship of the debugger components will be described further with reference to FIG. 2.

It is worth noting that although bugs are often associated with cold paths, sometimes bugs are associated with hot paths, thus identifying frequently executed code paths may be beneficial. For example, it may be beneficial to identify breakpoint locations in a hot path when the problem suggests that something is happening fast or too often. A problem with a mouse may be associated with a hot path. Additionally, if a programmer or other user is not familiar with a program, he or she may think that a path is frequently executed whereas it may not be. Thus, the identification of breakpoint locations based upon the frequency of execution of the code path may lead to the correction of this hypothesis and insertion of breakpoints in this code path (e.g., automatically or manually), which may assist the programmer in debugging the computer program.

Returning to computer 10, computer 10 also typically receives a number of inputs and outputs for communicating information externally. For interface with a user or operator, computer 10 typically includes a user interface 18 incorporating one or more user input devices 41 (e.g., a keyboard 42, a mouse 44, a trackball, a joystick, a touchpad, and/or a microphone, among others) and a display 43 (e.g., a CRT monitor, an LCD display panel, and/or a speaker, among others). Otherwise, user input may be received via another computer or terminal, e.g., via a client or single-user computer 20 coupled to computer 10 over a network 22. This latter implementation may be desirable where computer 10 is implemented as a server or other form of multi-user computer. However, it should be appreciated that computer 10 may also be implemented as a standalone workstation, desktop, or other single-user computer in some embodiments.

For non-volatile storage, computer 10 typically includes one or more mass storage devices 16, e.g., a floppy or other removable disk drive, a hard disk drive, a direct access storage device (DASD), an optical drive (e.g., a CD drive, a DVD drive, etc.), and/or a tape drive, among others. Furthermore, computer 10 may also include an interface 24 with one or more networks 22 (e.g., a LAN, a WAN, a wireless network, and/or the Internet, among others) to permit the communication of information with other computers and electronic devices. It should be appreciated that computer 10 typically includes suitable analog and/or digital interfaces between CPU 12 and each of components 14, 16, 18, and 24 as is well known in the art.

Computer 10 operates under the control of an operating system 26, and executes or otherwise relies upon various computer software applications, components, programs, objects, modules, data structures, etc. For example, a database management system (DBMS) may be resident in memory 14 to access a database 30, where profile data may be stored and/or updated when it is collected, resident in mass storage 16. Alternatively, collected profile data may be stored and/or updated in debugger 51 (e.g., breakpoint table 75, result buffer 85) or with the profiling framework 48 associated with compiler 45. Moreover, various applications, components, programs, objects, modules, etc. may also execute on one or more processors in another computer coupled to computer 10 via a network, e.g., in a distributed or client-server computing environment, whereby the processing required to implement the functions of a computer program may be allocated to multiple computers over a network.

In general, the routines executed to implement the embodiments of the invention, whether implemented as part of an operating system or a specific application, component, program, object, module or sequence of instructions, or even a subset thereof, will be referred to herein as "computer program code," or simply "program code." Program code typically comprises one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of computer readable media used to actually carry out the distribution. Examples of computer readable media include but are not limited to physical, recordable type media such as volatile and non-volatile memory devices, floppy and other removable disks, hard disk drives, magnetic tape, optical disks (e.g., CD-ROMs, DVDs, etc.), among others, and transmission type media such as digital and analog communication links.

In addition, various program code described hereinafter may be identified based upon the application within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

Figure 2:
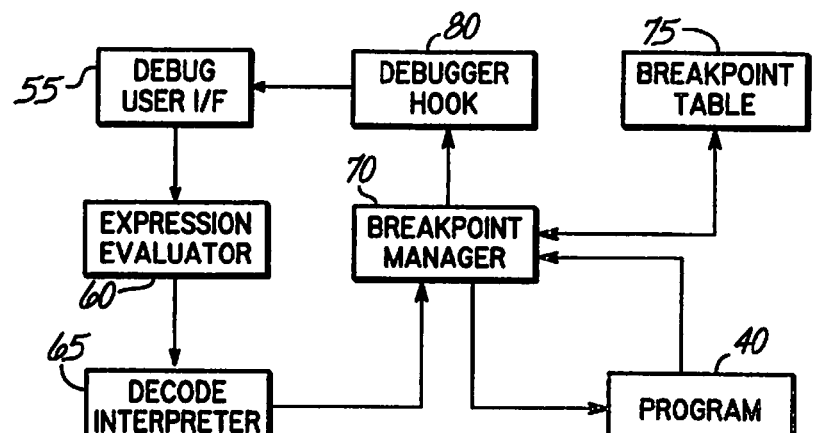
FIG. 2 is a block diagram illustrating the operation of the debugger of the computer system of FIG. 1.

Referring to FIG. 2, an exemplary operation of the debugger of the computer system of FIG. 1. The debug user interface 55, which may be a third-party debugging program, is shown initiating the process. The user interface 55 presents the program under debugging and may highlight the current line of the source code of the program on which a stop or error occurs. The user interface 55 allows the user to set breakpoints, display and change variable values by inputting the appropriate commands. In some instances, the user may define the commands by referring to high-order language (HOL) references such as line or statement numbers or software object references such as a program or module name, from which the physical memory address may be cross-referenced.

Next, the expression evaluator 60 parses the debugger command passed from the user interface 55 and uses a data structure (e.g., the symbol table 120 of FIG. 3) generated by the compiler 45 to map the line number in the debugger command to the physical memory address in memory 14. In addition, the expression evaluator 60 generates a decode program for the command. The decode program is machine executable language that emulates the commands. The decode program generated by the expression evaluator 60 is executed by the decode interpreter 65. The interpreter 65 handles expressions and decode instructions to perform various debugging steps. Results from decode interpreter 65 are returned to the user interface 55 through the expression evaluator 60. In addition, the decode interpreter 65 passes on information to the debug hook 80, which takes steps described below.

After the commands are entered, the user provides an input that resumes execution of the program 40. During execution, control is returned to the debugger 51 via the debug hook 80. The debug hook 80 is a code segment that returns control to the appropriate user interface. In some implementations, execution of the program eventually results in an event causing a trap to fire (e.g., a breakpoint is encountered). An interrupt handler, or similar means, passes information regarding the exception or interrupt to the breakpoint manager 70.

The breakpoint manager 70 references and updates the breakpoint table 75. Inserting and managing special op codes that cause these traps to fire is the responsibility of the breakpoint manager 70. When a trap fires, control is then returned to the debugger by the debug hook 80 and program execution is halted. The debug hook 80 then invokes the debug user interface 55 and may pass the results to the user interface 55. Alternatively, the results may be passed to the results buffer 85 (not shown in FIG. 2) to cache data for the user interface 55. In other embodiments, the user may input a command while the program is stopped, causing the debugger to run a desired debugging routine. Result values are then provided to the user via the user interface 55.

In the context of the invention, based upon profile data collected by a profiling framework 48, the debugger 51, or a component of the debugger, can generate a profile score for code paths of the program. The profile score can be compared to a threshold to gauge the corresponding code path's frequency of execution, and if the comparison is successful, a breakpoint location can be identified in the code path satisfying the comparison (e.g., the start of the code path) (discussed further in connection with FIGS. 3-7). In other words, whether a code path is frequently or infrequently executed may be based upon a threshold. The breakpoint can be set automatically at that location by the breakpoint manager 70 through the special op codes.

Additionally, in some embodiments, a variety of display representations, such as a display representation of the computer program (or more particularly the source code of the program) or a graphical display representation of a code path (e.g., infrequently or frequently executed code path), may be displayed in a display to the user, and the user may select at which identified breakpoint location he or she wants to manually set a breakpoint or have the debugger set a breakpoint. In these embodiments, the debugger may update the display representations, for example, in the programming environment, the user may interact with debug user interface 55, and the appropriate commands may be pass from component 55 to components 60, 65, 70 and 80 to make the modifications to incorporate the breakpoint.

Those skilled in the art will recognize that the exemplary environments illustrated in FIGS. 1 and 2 are not intended to limit the present invention. Indeed, those skilled in the art will recognize that other alternative hardware and/or software environments may be used without departing from the scope of the invention. For example, although the software construct such as a computer program 40 and the debugger 51 are shown residing on the same computer, a distributed environment is also contemplated. In particular, debugger 51 may be located on a network computer 20, while the computer program 40 to be debugged is on the computer 10.

Moreover, those of ordinary skill in the art will also appreciate that as used herein, computer program 40 may represent any code, including source code 47, that is to be examined, edited, compiled, and/or debugged. Furthermore, those of ordinary skill in the art will appreciate that the identification of at least one potential breakpoint location in a code path in the computer program may be implemented in a number of different manners consistent with the invention. For instance, a single breakpoint location in a code path may be identified, such as the first instruction of the code path, the last instruction of the code path, or any instruction in between the first and last instructions. However, those of ordinary skill in the art will also appreciate that by displaying a display representation of an infrequently executed code path or a frequently executed code path whose profile score satisfies a threshold (discussed further in FIG. 6), either graphically or within a display representation of a computer program, a set of potential breakpoint locations may also be identified. The primary difference between the alternatives is the number of breakpoint locations identified in a code path because in the latter instance, every line or flow of the display representation of the code path may be considered an identified potential breakpoint location.

Figure 3:
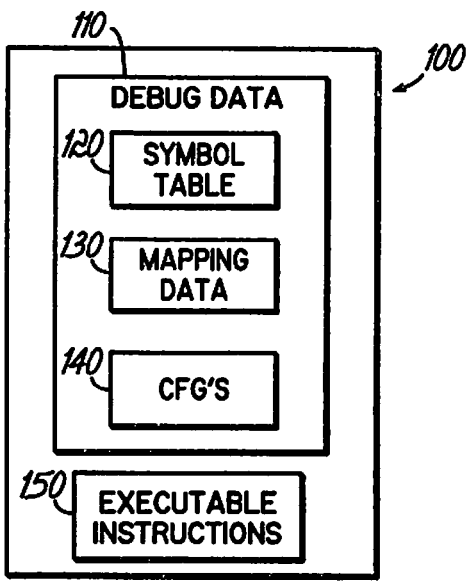
FIG. 3 is a block diagram of a program module of a computer program for which a potential breakpoint location may be identified.

Turning now to FIG. 3, FIG. 3 illustrates a program module 100 of computer program 40 for which a breakpoint location may be identified. Program module 100 may be created utilizing the hardware environment of FIG. 1, and may represent multiple routines. Program module 100 typically includes debug data 110 and executable instructions 150.

Debug data 110 may contain a symbol table 120 for expression evaluations of variables in computer program 40, mapping data 130 which maps the executable instructions to the source code 47 or source line of computer program 40, which may include offset values, and Control Flow Graphs (CFG's) 140. There may be a CFG for each routine and/or method (e.g., Java C++, etc.) of computer program 40. A CFG may contain a plurality of basic blocks (discussed hereinbelow in connection with FIG. 4B).

Executable instructions 150 represent the native language that a computer can follow, and generally reflect the source code 47 written by a user (e.g., developer) in a programming environment 50. Executable instructions 150 may be generated by compiling source code 47 as generally described hereinabove. Additionally, source code may be compiled into executable instructions indirectly or directly consistent with the principles of the present invention, or may be first compiled into an intermediate language such as byte code and then turned into executable instructions at runtime, as with many Java programs. A part of the compilation process, the compiler 45 may also produce symbol table 120, mapping data 130, and CFG's 140.

Figure 4A:
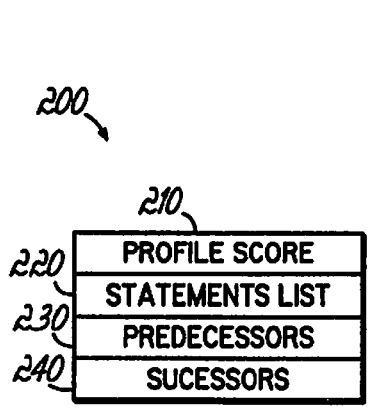
FIG. 4 is a block diagram of a basic block node of a control flow graph of the program module of FIG. 3 and a flowchart of a control flow graph illustrating five basic block nodes.
Figure 4B:
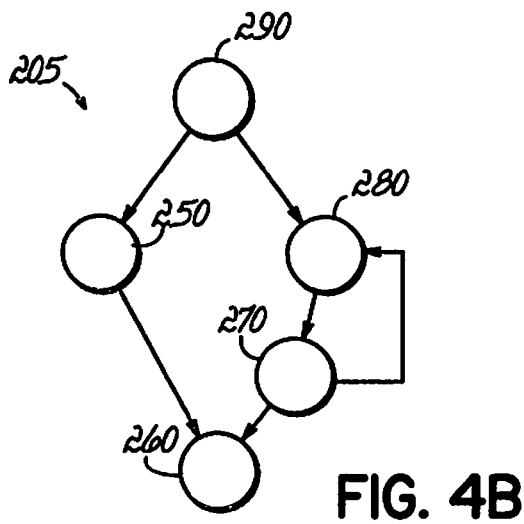

Turning now to FIG. 4A, FIG. 4A depicts at 200 a block diagram of a basic block of the program module 100 of FIG. 3. Basic block 200 is associated with a potentially executable sequence of source statements such as a subset of statements of a routine illustrated as source code 47. As such, basic block 200 may represent a code path of the computer program. FIG. 4B depicts a flowchart of a control flow graph 205 illustrating five basic block 200 in the form of nodes 250, 260, 270, 280, and 290. Both the basic block 200 of FIG. 4A and/or CFG 205 of FIG. 4B may be generated by compiler 45.

Starting with basic block 200, conventional techniques may be used for determining basic blocks from a method or a routine in a computer program. In particular, one technique may be to identify the leaders of a basic block. A leader may be the first statement of a method or routine in a program, any statement that is the target of a conditional or an unconditional goto (e.g., targets of jumps or branches), or any statement that immediately follows a goto and/or a conditional goto statement (e.g., fall through source code instruction). As such, basic block 200 may include a statement that is a leader and all statements up to, but not including, the next leader or the end of the program. One or more basic blocks may also be determined from a routine based upon entry and exit points. For instance, the first statement in a loop in the routine may be the beginning of a new basic block 200 whereas a "return" statement may signal the end of a basic block.

Generally, a basic block 200 (or basic block node when illustrated graphically as in a control flow graph 205 of FIG. 4B), may represent a sequence of consecutive statements in source code 47. As such, to execute the basic block 200 when program 40 is executed, the basic block 200 can only be entered at the beginning of the sequence and must exit only at the end of the sequence. Halting or branching occurs at the end of the basic block 200. Block 200 may also include a statement list 220, which includes the consecutive statements of the sequence and a listing of the predecessors 230 of the statements and the successors 240 of the statements. Predecessors 230 and successors 240 may be links or pointers to other statements in basic block 200 and/or other basic blocks.

Additionally, basic block 200 may contain a profile score 210, which may be generated by a compiler or profiling framework based upon the collected profile data. The profile score may measure the number of times the statements in the basic block are executed, the number of IO's, etc. Thus, whether a code path is frequently or infrequently executed may be based upon a comparison between the profile score and a threshold (discussed further in FIG. 6). Nonetheless, those of ordinary skill in the art may appreciate that these statements may be a path in the computer program, and as a basic block represents a code path, the profile data of the code path may be transformed into a profile score and the frequency of execution of the code path can be identified. Once generated, the profile score may be sent to debugger 51 via an API, for example, for identifying a potential breakpoint location (discussed further in FIG. 6).

Turning next to CFG 205, CFG 205 has five nodes (i.e., 250, 260, 270, 280 and 290), with each node representing a basic block 200. Thus, CFG 200 has five basic block nodes. As depicted, CFG 205 indicates that basic block node 270 refers back to basic block node 280, thus 280 may be a predecessor of basic block node 270. The remaining basic block nodes are also representative of other statements of a routine of computer program 40 and the general flow of the routine with respect to these nodes are illustrated by the arrows.

Thus, those of ordinary skill in the art will appreciate that basic block 200 of FIG. 4A and/or control flow graph 205 of FIG. 4B may be used to represent the code paths that may be traversed through a computer program 40 during the execution of the computer program. Specifically, a routine or a method of the program may be illustrated as a control flow graph 205, and more particularly, each control flow graph may contain one or more basic blocks 200, with each basic block associated with a potentially executable sequence of source statements from source code 47.

Figure 5:
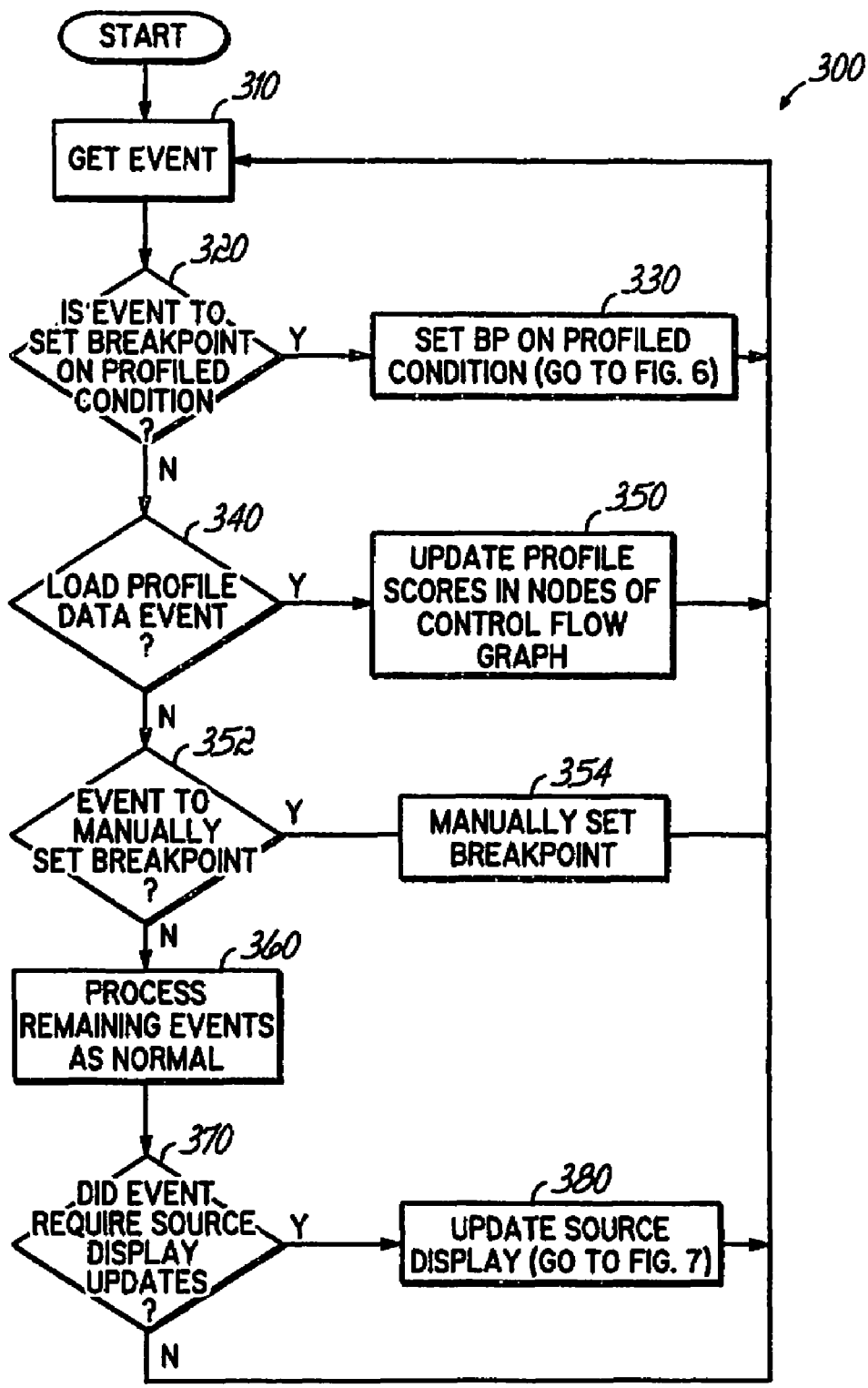
FIG. 5 is a routine for debugging consistent with the principles of the present invention.

Turning next to FIG. 5, FIG. 5 illustrates an exemplary routine 300 for debugging consistent with the principles of the present invention. In particular, routine 300 may be utilized as a debug interface called by debugger hook 80 of debugger 51. Starting with block 310, block 310 gets an event. An event may be a user performing an action such as using a mouse to click on a display representation of an icon in a display representation of a menu in a display. In some embodiments consistent with the principles of the present invention, a display representation of an option to have a breakpoint set upon entry of at least one infrequently executed code path (e.g., one cold path, two cold paths, all cold paths, etc.) and/or a display representation of an option to have a breakpoint set upon entry of at least one frequently executed code path (i.e., hot path, two hot paths, all hot paths, etc.) may be displayed to a user via an icon, a prompt, or any other form (e.g., via a sound, etc.). An icon or a prompt may display the following, for example, "set breakpoint on entry to all cold paths" and/or "set breakpoint on entry to all hot paths" A user may also receive an indication that a breakpoint may be set (e.g., in a location in the code path other than upon entry of the code path, in a specified method, in a sub-region of a method, etc.) as indicated above. The user may utilize a mouse, a button, a keyboard shortcut, his or her preferences, etc. to select the option(s).

Next, block 320 determines whether the event of block 310 is an event to set a breakpoint on a profiled condition. A profiled condition refers to the code paths for which profile data has been collected. If the event is for the debugger to set a breakpoint on a profiled condition, control may pass to block 330 to set the breakpoint (i.e., BP) on the profiled condition via routine 400 of FIG. 6.

Figure 6:
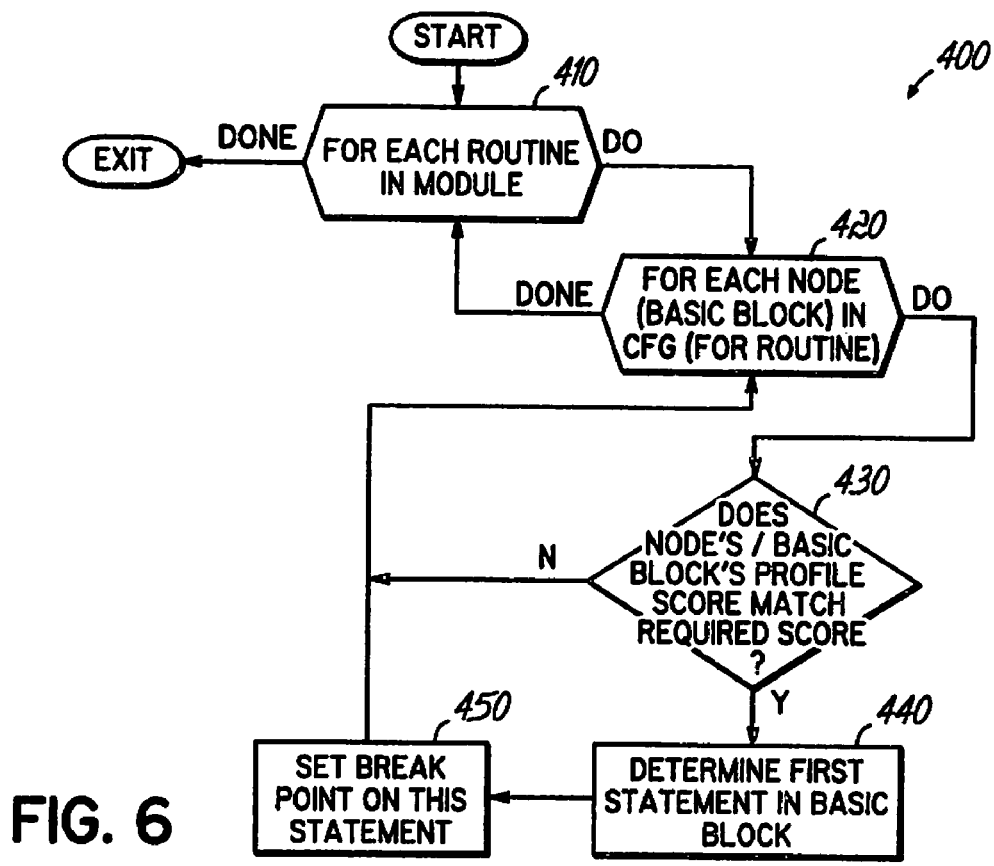
FIG. 6 is a routine for identifying a potential breakpoint location consistent with the principles of the present invention.

For simplicity, attention will now turn to routine 400 of FIG. 6 for identifying a potential breakpoint location. In particular, routine 400 may be used to identify at least one potential breakpoint location in a code path in the computer program based upon the frequency of execution of the code path as identified by collected profile data. The code path may be infrequently or frequently executed. As noted above, the determination of whether a code path is frequently or infrequently executed may be based upon a threshold. As such, the profile score of the code path (located in the basic block associated with the code path) may be compared to the threshold, which may be configurable, to determine which code paths are infrequently and/or frequently executed.

Turning now to routine 400, blocks 410 and 420 of routine 400 illustrate two nested FOR loops. In particular, for each routine in the program module illustrated in FIG. 3 of computer program 40 (block 410), the FOR loop of block 420 will, for each basic block or basic block node in the CFG of the routine, determine if the profile score of the basic block or basic block node matches a required score (i.e., a threshold) (block 430). For instance, if the profile score matches a threshold by being the exact threshold value or by being below the threshold (e.g., a threshold of 2% execution), this may indicate an infrequently executed code path. On the other hand, if the profile score matches or exceeds the threshold (e.g., a threshold of 80% execution), this may indicate a frequently executed code path.

Next, if the profile score satisfies the required score in block 430, control passes to block 440 to determine the first statement in the basic block node or basic block. By determining the first statement, the beginning of the code path represented by the basic block may be identified. Those of ordinary skill in the art may appreciate that oftentimes it may be helpful for a user trying to successfully debug a computer program to set a breakpoint before or upstream of the bug, and then step through the subsequent instructions. Thus, consistent with the principles of the invention, a potential breakpoint location may be identified at the start of the code path satisfying the criteria in block 440.

As such, a breakpoint location may be identified at the first statement of an infrequently executed code path, which may likely posses the bug. Similarly, some bugs may be associated with a code path that is executed many times, thus, if the profile score of the code path as compared to the threshold indicates a frequently executed code path, the first statement in the basic block corresponding to the code path may be identified as a breakpoint location. Thus, block 430 and 440 may be used to identify the breakpoint location in a code path (e.g., beginning of the code path) based upon the frequency of execution of the code path (e.g., infrequently, frequently) as identified by the profile data (e.g., profile score).

Next, control may pass to block 450 to set the breakpoint on the statement (e.g., the first statement in basic block). As mentioned hereinabove, the breakpoint may be automatically set by the debugger or by practically any other object, entity, or mechanism that is capable of setting breakpoints. Similarly, the actions illustrated in blocks 430 and 440 may also be accomplished by a debugger, object, entity, or practically any other mechanism capable of comparing and determining. An indication that the breakpoint has been may also be given to the user prior to returning control to block 420.

Returning to block 430 in FIG. 6, if the basic block node's profile score does not match the required score, control may pass to block 420 to process the next basic block node of the CFG as described above. Once all the basic block nodes in the CFG have been processed in block 420, and all the routines in the module have been processed in block 410, routine 400 exits.

Returning back to routine 300 in FIG. 5, if the event was not to set a breakpoint on the profiled condition, block 320 passes to block 340. Block 340 determines if the event was a load profile data event instead. If so, the profile data may be loaded and control passes to block 350 to update profile scores in the basic block nodes of the control flow graph. Control then returns to block 310.

Consistent with the principles of the present invention, various techniques associated with loading and/or updating profile data discussed above and hereinbelow are contemplated within the scope of the present invention. For example, those of ordinary skill in the art may appreciate that some compilers and/or profiling frameworks of compilers may collect profile data at varying times. For instance, in some compilers, the order may be compile then profile, and then recompile, where the profiling may be accomplished only upon request of a profiling step. On the other hand, other compilers may collect fresh profile data each time a computer program is executed, or may continuously collect profile data for at least some routines or methods in a computer program. Moreover, profile data (e.g., data prior to and after the change) may be accumulated from multiple executions to get a better picture of the computer program. Thus, collection and/or updates of profile data may vary in embodiments consistent with the principles of the present invention.

Those of ordinary skill in the art may also appreciate that when profile data is collected multiple times, an average of the profile data may be utilized for the profile score. Similarly, the most recent profile data may be collected and utilized, instead of older and potentially stale profile data. In particular, those of ordinary skill in the art may appreciate that after a first breakpoint is set and a user successfully overcomes the bug associated with issue, the computer program may be re-executed with the corrections to collect additional profile data, which reflects the change.

In general, a computer program may be completely executed at least once to collect profile data. Furthermore, a computer program may be completely executed at least once to reproduce an error and collect profile data reflecting the error. Once too much data is collected, profile data may be removed from and the collection may start anew. In the instance where there may be no profile data available, new profile data may be collected as the program is run, or a similar process as above may be followed.

Returning to block 340, if the event was not a load profile data event, control passes to block 352 to determine if the event is to manually set a breakpoint. If so, control passes to block 354 to allow the user to select an identified potential breakpoint location and set a breakpoint at the identified potential breakpoint location that he or she desires. The user can select an identified potential breakpoint location by putting his or her cursor over one of the highlighted lines of the display representation of the source code in the source display and clicking on the line (discussed in connection with blocks 370 and 380 and routine 500 of FIG. 7). Next, control passes to block 310 to get more events.

Otherwise, control may pass to block 360 to process any other remaining events as normal. Next, control passes to block 370 to determine if an event that requires the source display to be updated was encountered. If not, control passes to block 310. If so, control passes to update the source display, and then to routine 500 in FIG. 7.

Turning to the source display, for simplicity, blocks 370, 380 and routine 500 in FIG. 7 will be discussed together. First, it is worth noting that users differ as to the amount of control they want during debugging, thus, some may prefer to manually insert breakpoints after the breakpoint locations have been identified by the principles of the present invention. For instance, a user may not want breakpoints at the start of every infrequently executed code path. Thus, in some embodiments consistent with the principles of the present invention, identified breakpoint locations may be communicated to the user but the breakpoints are set by the user not the debugger. To accomplish this communication, a display representation of at least one infrequently executed code path and/or a display representation of at least one frequently executed code path may be highlighted in a display representation of the computer program, or more particularly, in a display representation of the source code of the program. For example, statements that are part of a basic block that is determined to be infrequently executed can be displayed in blue coloring whereas statements that are part of a basic block that is determined to be frequently executed can be displayed in red coloring, etc.

Figure 7:
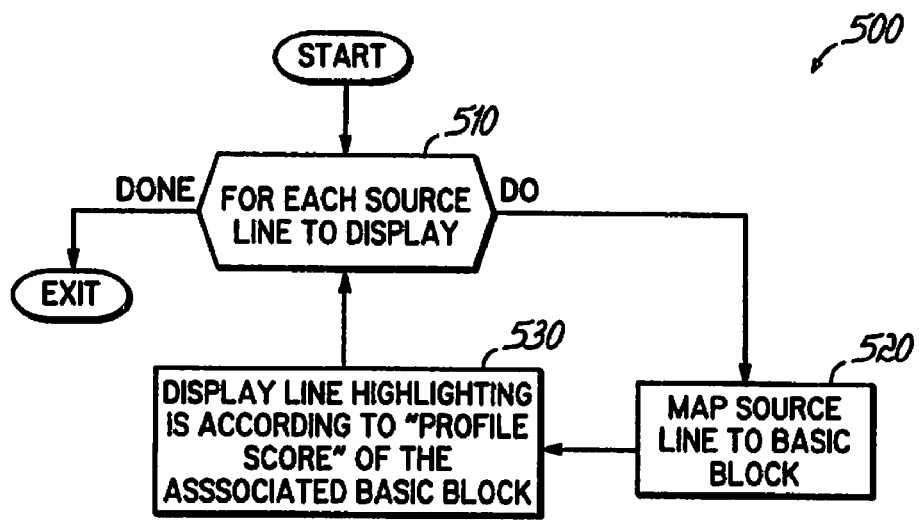
FIG. 7 is a routine for highlighting a display consistent with the principles of the present invention.

This communication is generally depicted in routine 500 of FIG. 7. Specifically, block 510 initiates a FOR loop for each source line to the display (e.g., as part of the programming environment 50), control may pass from block 510 to block 520 for each source line to map the source line to the basic block. Next, in block 530 the display representation of the source line of the code path may be highlighted according to the profile score of the associated basic block, and this highlighting may be displayed to the user, before returning control to block 510. In particular, the code path may be displayed in practically in any manner that draws attention, for instance, the characters or variables may be highlighted (e.g., coloring, bubbling, shading, underlining, bolding, etc.), additional words may be utilized, symbols such as ovals, arrows, or checks may be utilized (e.g., to the left of the line), numbers indicating the line of the basic block such as the first statement in the basic block may be utilized, etc. For example, a source line with a profile score that would indicate that the statement is from a basic block representing a code path that is frequently executed may be displayed, for instance, in red to indicate the high frequency of execution to the user. Similarly, a source line associated with a basic block with a code path that is infrequently executed based upon the profile score may be displayed in blue to indicate the infrequent executions. Varying degrees or shades of colors may be utilized as well. Thus, consistent with the principles of the present invention, this may be an additional way of identifying a breakpoint location. Once all source lines have been processed by routine 500, block 510 returns control to block 310 of FIG. 5.

Those of ordinary skill in the art may appreciate that routine 300 and 500 may be adapted to allow a user to manually select an identified breakpoint location from a graphical display representation of at least one infrequently executed code path and/or a graphical display representation of at least one frequently executed code path. The code path may be graphically displayed such as the CFG 205 in FIG. 4B. Additionally, the code paths displayed may be color coded, for instance the most infrequently used code path may be depicted in a very blue color, whereas a frequently executed code paths may be depicted in different degrees of red color. For instance a code path that is executed an average number of times may be displayed in yellow, green, etc. Furthermore, the user may be visually presented with hot and/or code path profile information (e.g., based upon a comparison of the profile score and threshold) and allow the user to make selections. One of ordinary skill in the art will appreciate that whether a code path is frequently or infrequently executed may depend upon the threshold used in block 430 of FIG. 6.

Additionally, the embodiments described hereinabove can be adapted to automatically set at least one other breakpoint after the previously set breakpoint. For instance, a further embodiment may determine the last breakpoint location on cold path that was successfully set and allow the user to have the debugger set at least one breakpoint after the previously set breakpoint, or downstream of it, that is not quite as cold. This may allow the user to more efficiently drill down to find a bug.

As an example, a programmer writes source code A. Source code A may be in the form of one or more projects that need to be compiled. After compilation, the profile data associated with source code A, may be associated with the project as another element of the project. The programmer may have to turn on the profiling step. During compilation, CFG's and/or basic blocks may be created for each routine, and based upon the profile data, a profile score may be generated for each code path or basic block of computer program A. Profile data may be additionally collected as computer program A is subsequently executed.

Next, a threshold, which may be in the form of a percentage, may be compared with the profile scores of the code paths of computer program A. There may be more than one threshold. For instance, the threshold may be eighty percent. Thus, if a code path has a profile score of eighty percent or over, a breakpoint location may be identified for this code path, such as the first statement of the code pathibasic block. Similarly, if a code path has a profile score of two percent or below, for example, which may be a different threshold, then a breakpoint location may be identified for this code path. In the former, the high percentage may indicate that the code path is frequently executed where as in the latter the low percentage may indicate that the code path is infrequently executed. Nonetheless, breakpoint locations may be identified for both, or for either one, and breakpoint locations may be set automatically by the debugger or manually in response to a users actions (e.g., selecting a displayed option).

Generally, those of ordinary skill in the art will appreciate that users may be assisted in finding optimal locations for setting breakpoints via the identification of breakpoint locations described above. In particular, the debugger utilizes profile data to assist the user in the identification of breakpoint locations, and if the user desires, the debugger can automatically set the breakpoints at identified breakpoint locations. Thus, for example, the breaking on cold paths may allow the debugger to automatically stop between major functional steps in a program, which may result in the user being able to quickly isolate where the bugs are occurring. Moreover, the user is provided with the ability to manually set breakpoints in identified breakpoints, thus, allowing the user to set them where the user deems appropriate.

Various modifications may be made to the illustrated embodiments without departing from the spirit and scope of the invention. Therefore, the invention lies in the claims hereinafter appended.

What is claimed is:

1. A computer implemented method of debugging a computer program, the computer-implemented method comprising:
    collecting profile data for a computer program to identify frequencies of execution for a plurality of code paths in the computer program; and
    automatically identifying at least one potential breakpoint location in a code path in the computer program based upon a frequency of execution of the code path as identified in the profile data.

2. The computer implemented method of claim 1, further comprising indicating to a user that a breakpoint can be set, wherein the breakpoint is set at the identified breakpoint location.

3. The computer implemented method of claim 1, further comprising displaying to a user a display representation of an option to set a breakpoint upon entry of at least one infrequently executed code path or frequently executed code path.

4. The computer implemented method of claim 1, further comprising determining whether a user wants a breakpoint set, wherein the breakpoint is set at the identified breakpoint location.

5. The computer implemented method of claim 1, further comprising setting a breakpoint at an identified breakpoint location.

6. The computer-implemented method of claim 5, wherein the identified breakpoint location is selected by a user.

7. The computer implemented method of claim 5, wherein the breakpoint is automatically set by the debugger.

8. The computer implemented method of claim 5, further comprising automatically setting at least one other breakpoint after the previously set breakpoint.

9. The computer implemented method of claim 1, wherein the code path is infrequently executed.

10. The computer implemented method of claim 1, wherein the code path is frequently executed.

11. The computer implemented method of claim 1, further comprising highlighting a display representation of at least one infrequently executed code path or frequently executed code path in a display representation of the computer program.

12. The computer implemented method of claim 1, further comprising displaying a graphical display representation of at least one infrequently executed code path or frequently executed code path.

13. The computer implemented method of claim 1, wherein the profile data is the most recently collected profile data.

14. The computer implemented method of claim 1, wherein the profile data is collected continuously.

15. The computer implemented method of claim 1, further comprising determining whether the code path is at least one of an infrequently executed code path or a frequently executed code path.

16. An apparatus, comprising:
    a processor;
    a memory; and
    program code configured to debug a computer program by collecting profile data for a computer program to identify frequencies of execution for a plurality of code paths in the computer program and automatically identifying at least one potential breakpoint location in a code path in the computer program based upon a frequency of execution of the code path as identified in the profile data.

17. The apparatus of claim 16, wherein the program code is further configured to indicate to a user that a breakpoint can be set, wherein the breakpoint is set at the identified breakpoint location.

18. The apparatus of claim 16, wherein the program code is further configured to determine whether a user wants a breakpoint set, wherein the breakpoint is set at the identified breakpoint location.

19. The apparatus of claim 16, wherein the program code is further configured to set a breakpoint at an identified breakpoint location.

20. The apparatus of claim 16, wherein the code path is infrequently executed.

21. The apparatus of claim 16, wherein the code path is frequently executed.

22. The apparatus of claim 16, wherein the program code is further configured to highlight a display representation of at least one infrequently executed code path or frequently executed code path in a display representation of the computer program.

23. The apparatus of claim 16, wherein the program code is further configured to display a graphical display representation of at least one infrequently executed code path or frequently executed code path.

24. The apparatus of claim 16, wherein the program code is further configured to determine whether the code path is at least one of an infrequently executed code path or frequently executed code path.

25. A program product, comprising:
  program code configured to debug a computer program by collecting profile data for a computer program to identify frequencies of execution for a plurality of code paths in the computer program and automatically identifying at least one potential breakpoint location in a code path in the computer program based upon a frequency of execution of the code path as identified in the profile data; and
  a recordable type computer readable medium storing the program code.

* * * * *